(12) United States Patent
Tashiro

(10) Patent No.: US 8,427,534 B2
(45) Date of Patent: Apr. 23, 2013

(54) PROCESSOR FOR ELECTRONIC ENDOSCOPE, VIDEOSCOPE, AND ELECTRONIC ENDOSCOPE APPARATUS

(75) Inventor: Yosuke Tashiro, Tokyo (JP)

(73) Assignee: Hoya Corporation, Tokyo (JP)

( * ) Notice: Subject to any disclaimer, the term of this patent is extended or adjusted under 35 U.S.C. 154(b) by 976 days.

(21) Appl. No.: 12/420,210

(22) Filed: Apr. 8, 2009

(65) Prior Publication Data

US 2009/0256905 A1   Oct. 15, 2009

(30) Foreign Application Priority Data

Apr. 10, 2008 (JP) ................................. 2008-102019

(51) Int. Cl.
*A62B 1/04* (2006.01)

(52) U.S. Cl.
USPC .................. 348/65; 348/64; 348/66; 348/67; 348/68; 382/167

(58) Field of Classification Search .............. 348/65–76; 382/167
See application file for complete search history.

(56) References Cited

U.S. PATENT DOCUMENTS

| | | | | |
|---|---|---|---|---|
| 6,879,339 | B2* | 4/2005 | Ozawa | 348/71 |
| 7,232,410 | B2* | 6/2007 | Takahashi | 600/180 |
| 7,365,768 | B1* | 4/2008 | Ono et al. | 348/76 |
| 7,670,286 | B2* | 3/2010 | Imaizumi et al. | 600/160 |
| 8,284,245 | B2* | 10/2012 | Takemura et al. | 348/71 |
| 2003/0001952 | A1* | 1/2003 | Iida et al. | 348/69 |
| 2003/0063188 | A1* | 4/2003 | Takahashi et al. | 348/65 |
| 2003/0197781 | A1* | 10/2003 | Sugimoto et al. | 348/72 |
| 2007/0091170 | A1* | 4/2007 | Ota | 348/65 |
| 2008/0100702 | A1* | 5/2008 | Tannai | 348/65 |
| 2008/0198223 | A1* | 8/2008 | Iriyama | 348/65 |
| 2008/0294000 | A1 | 11/2008 | Iwamoto | |
| 2009/0021578 | A1* | 1/2009 | Yamazaki et al. | 348/65 |
| 2009/0062609 | A1 | 3/2009 | Suda | |
| 2009/0062612 | A1 | 3/2009 | Suda | |
| 2009/0073261 | A1* | 3/2009 | Takemura et al. | 348/71 |
| 2009/0109284 | A1 | 4/2009 | Takayama | |
| 2009/0122135 | A1 | 5/2009 | Matsui | |
| 2010/0217077 | A1* | 8/2010 | Gono | 600/109 |

FOREIGN PATENT DOCUMENTS

| | | |
|---|---|---|
| JP | 11-32983 | 2/1999 |
| JP | 2002-369798 | 12/2002 |
| JP | 2005-312713 | 11/2005 |

OTHER PUBLICATIONS

English language Abstract of JP 11-32983, Feb. 9, 1999.
English language Abstract of JP 2005-312713, Nov. 10, 2005.
English language Abstract of JP 2002-369798, Dec. 24, 2002.

\* cited by examiner

*Primary Examiner* — Duyen Doan
(74) *Attorney, Agent, or Firm* — Greenblum & Bernstein, P.L.C.

(57) ABSTRACT

A processor for an electronic endoscope, which is configured to be connected with a videoscope adapted to generate a picture signal for an image of an observed object through color adjustment using color adjustment data and to transmit the generated picture signal to the processor, the processor includes a light source configured to emit light for illuminating the observed object, a determining unit configured to determine whether the color adjustment data used by the videoscope is adapted to the light source, a color conversion data acquiring unit configured to acquire color conversion data adapted to the color adjustment data when the determining unit determines that the color adjustment data is not adapted to the light source, and a color converter configured to perform color conversion for the picture signal transmitted by the videoscope using the color conversion data acquired by the color conversion data acquiring unit.

21 Claims, 10 Drawing Sheets

| ADDRESS | DATA NAME |
|---|---|
| E000h | CONV 11 |
| E001h | CONV 12 |
| E002h | CONV 13 |
| E003h | CONV 21 |
| E004h | CONV 22 |
| E005h | CONV 23 |
| E006h | CONV 31 |
| E007h | CONV 32 |
| E008h | CONV 33 |
| E100h | CONV 11 |
| E101h | CONV 12 |
| E102h | CONV 13 |
| E103h | CONV 21 |
| E104h | CONV 22 |
| E105h | CONV 23 |
| E106h | CONV 31 |
| E107h | CONV 32 |
| E108h | CONV 33 |

HD/KD
  USED LAMP : HALOGEN LAMP
  COLOR ADJUSTMENT : FOR XENON LAMP

HD/MD
  USED LAMP : HALOGEN LAMP
  COLOR ADJUSTMENT : FOR METAL HALIDE LAMP

FIG. 5

| ADDRESS | DATA NAME |
|---|---|
| E000h | B MTX |
| · | R MTX |
| · | B GAIN |
| · | R GAIN |
| · | B CONT |
| · | R CONT |
| · | C LEVEL |
| · | C-γ CONT |
| · | Cr HUE |
| · | Cb HUE |
| · | Cr GAIN |
| E00Bh | Cb GAIN |
| E100h | |
| · | |
| · | |
| · | |
| · | |
| · | |
| · | |
| · | |
| · | |
| · | |
| · | |
| E10Bh | |
| E200h | |
| · | |
| · | |
| · | |
| · | |
| · | |
| · | |
| · | |
| · | |
| · | |
| · | |
| E20Bh | |

KD (COLOR ADJUSTMENT DATA FOR XENON LAMP) — rows E000h to E00Bh

VACANT AREA 1 — rows E100h to E10Bh

VACANT AREA 2 — rows E200h to E20Bh

FIG. 7

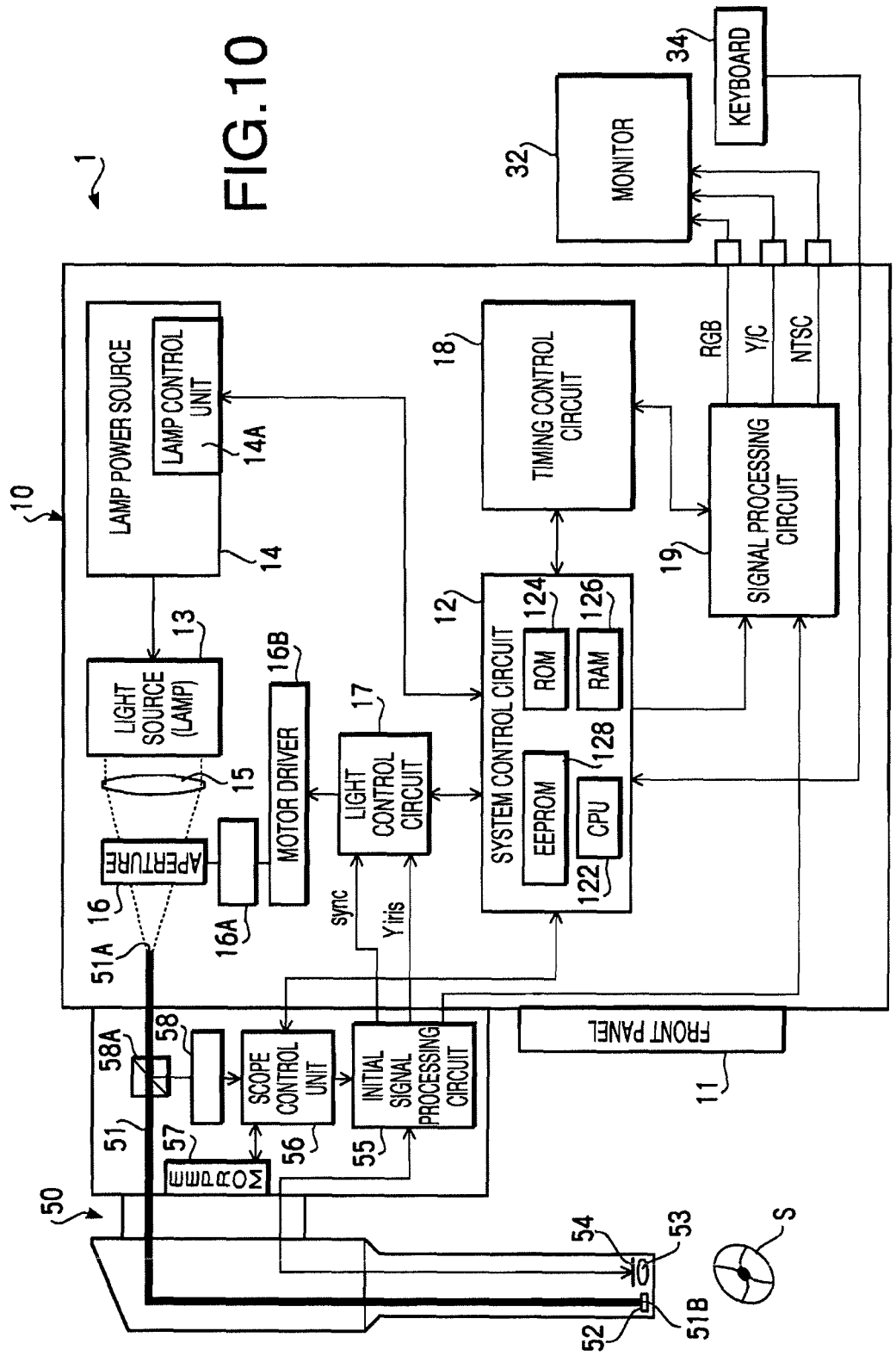

PROCESSOR FOR ELECTRONIC ENDOSCOPE, VIDEOSCOPE, AND ELECTRONIC ENDOSCOPE APPARATUS

BACKGROUND OF THE INVENTION

The following description relates to one or more processors for an electronic endoscope that are connectable with plural types of videoscopes each of which is replaceable relative to the processor and provided with a color adjustment processing device.

An electronic endoscope has been known, which is configured to observe an intended region inside a body with a solid state image sensor inserted into the body such as a charge coupled device (CCD) image sensor. A conventional electronic endoscope includes a cable-shaped videoscope configured to be inserted into the body, and a processor configured to supply, to the videoscope, light for illuminating the observed region inside the body and to convert an image signal received from the videoscope into a video signal through various sorts of processing. Further, the conventional electronic endoscope includes a monitor configured to display thereon an observed image based on the video signal generated by the processor. The processor has a light source configured to emit light for illuminating the observed region. The light emitted from the light source is transmitted to the distal end of the scope through a light guide (an optical fiber bundle) provided within the videoscope. When the observed region is illuminated with the light emitted from the distal end of the scope, the light is partially reflected to form an image of the observed region on the image sensor disposed at the distal end of the scope. Then, an image signal corresponding to the image of the observed region is read out from the image sensor.

The videoscope is detachably attached to the processor. Thereby, it is possible to use a desired one of various types of videoscopes depending on the observed region or the body size of the examined subject. In other words, plural types of videoscopes can be utilized in a manner replaceable relative to a single processor. Further, each of the plural types of videoscopes is connectable with two or more processors with different capabilities and different performances.

In the meantime, the design (e.g., a viewing angle, an observation depth, an absorption spectrum, etc.) of each optical element such as a lens and a color filter may vary depending on the type of the videoscope. Therefore, even though the same processor is used, how the image displayed on the monitor is visually sensed (e.g., in terms of brightness or color tone) may vary depending on the type of the videoscope connected to the processor. Moreover, depending on the type of the light source used, the color tone of the observed image varies due to the emission spectrum that varies depending on the type of the light source. For example, a xenon lamp, which is the most commonly used as a light source for an endoscope, emits white light with spectral characteristics close to those of the daylight color. On the other hand, a halogen lamp emits yellowish light with few short wavelength components. Thus, owing to the emission spectrum varying depending on the light source used, even though the same videoscope is used to take an image of the same region, the color components of the color image signal read out from the image sensor vary depending on the type of the light source used.

Japanese Patent Provisional Publication No. 2002-369798 (hereinafter, simply referred to as '798 Publication) discloses a solution to achieve highly faithful color reproducibility by compensating the color tone differences between the observed images generated by different types of videoscopes or by different types of processors (light sources). According to an electronic endoscope system disclosed in '798 Publication, a storage provided within a videoscope previously stores thereon data on the characteristics of the videoscope and color adjustment data adapted to each of plural types of light sources. Based on the data stored, a color adjustment process adapted to the videoscope and light source to be used is performed by an initial signal adjustment circuit loaded in the videoscope. Namely, the electronic endoscope system disclosed in '798 Publication can display observed images with the same color tone on the monitor, regardless of the typed of videoscope used, by compensating at the videoscope side the difference between color tones caused due to different types of videoscopes or light sources. In the same manner, no matter what type of processor (light source) is used, it is possible to display observed images with the same color tone on the monitor and thus to improve the color reproducibility.

SUMMARY OF THE INVENTION

Nowadays, electronic endoscopes have been being more widely used, not only in large medical facilities such as university hospitals but also in relatively small medical facilities or medical facilities in developing countries. Therefore, instead of a xenon lamp, which has been employed for most of conventional electronic endoscopes for a reason of its excellent color rendering properties, a demand for a processor loaded with a less expensive halogen lamp is growing. However, most of existing videoscopes are designed just for the xenon lamp, and have only color adjustment data adapted to the xenon lamp. Hence, even though such a videoscope is connected to a processor loaded with a halogen lamp, a color adjustment process is performed that is adapted to illumination with white light from the xenon lamp. Thereby, it is unfortunate that a yellowish observed image is obtained. In order to obtain an observed image with highly faithful color reproducibility, it is required to purchase a videoscope configured as described in '798 Publication. It leads to a problem that the existing medical resources cannot be effectively utilized.

Aspects of the present invention are advantageous to provide one or more processors for an electronic endoscope each of which makes it possible to display on a monitor an observed image with an appropriate color tone, even though the processor is connected with a videoscope configured to perform color adjustment adapted to a light source of a different type from a light source loaded in the processor.

According to aspects of the present invention, a processor for an electronic endoscope is provided, which is configured to be connected with a videoscope adapted to generate a picture signal for an image of an observed object through color adjustment using first color adjustment data and to transmit the generated picture signal to the processor. The processor includes a light source configured to emit light for illuminating the observed object, a determining unit configured to determine whether the first color adjustment data used by the videoscope is adapted to the light source, a color conversion data acquiring unit configured to acquire color conversion data adapted to the first color adjustment data when the determining unit determines that the first color adjustment data is not adapted to the light source, and a color converter configured to perform color conversion for the picture signal transmitted by the videoscope using the color conversion data acquired by the color conversion data acquiring unit.

Optionally, the processor may further include a color conversion data storage configured to store thereon at least one kind of color conversion data. In this case, preferably, the color conversion acquiring unit may be configured to select and acquire the color conversion data adapted to the first color adjustment data from the at least one kind of color conversion data stored on the color conversion data storage.

Optionally, the processor may further include a color adjustment data storage configured to store thereon second color adjustment data adapted such that the videoscope generates a picture signal for the observed object with an appropriate color tone through the color adjustment using the second color adjustment data, and a color adjustment data transmitter configured to transmit, to the videoscope, the second color adjustment data stored on the color adjustment data storage.

Optionally, the picture signal transmitted by the videoscope may have a format in which the picture signal includes a brightness signal and at least two color difference signals, and the color conversion data may be matrix data adapted to convert the picture signal into a picture signal having a format identical to the format of the picture signal.

Optionally, the color conversion data may be matrix data adapted to convert RGB signals into RGB signals.

Optionally, the color conversion data may be 3×3 matrix data.

Optionally, the color conversion data may be adapted to convert the picture signal transmitted by the videoscope into a picture signal with such a color tone as to be attained when the observed object is observed with naked eyes under illumination with standard light.

According to aspects of the present invention, further provided is a videoscope configured to illuminate an observed object with light supplied, by a light source of a processor connected with the videoscope. The videoscope includes an image sensor configured to generate a color image signal for an image of the observed object formed under illumination with the light, a color adjustment data acquiring unit configured to acquire color adjustment data adapted to the light source from the processor, a color adjustment data storage configured to store thereon the color adjustment data acquired by the color adjustment data acquiring unit, and a color adjuster configured to convert the color image signal generated by the image sensor into a picture signal through color adjustment using the color adjustment data stored on the color adjustment data storage.

Optionally, the color adjustment data storage may be a rewritable storage configured to store thereon plural kinds of color adjustment data.

Further optionally, the videoscope may further include a light source identifying unit configured to identify a type of the light source that supplies the light for illuminating the observed object, and a color adjustment data selector configured to select the color adjustment data adapted to the light source from the plural kinds of color adjustment data stored on the color adjustment data storage, based on the type of the light source identified by the light source identifying unit. In this case, preferably, the color adjuster may be configured to convert the color image signal into the picture signal through the color adjustment using the color adjustment data selected by the color adjustment data selector.

Still optionally, the light source identifying unit may be configured to receive information on the light source from the processor and to identify the type of the light source based on the received information.

Alternatively, and optionally, the videoscope may further include a spectrum measuring unit configured to measure spectral characteristics of the light supplied by the light source. In this case, preferably, the light source identifying unit may be configured to identify the type of the light source based on the spectral characteristics measured by the spectrum measuring unit.

Optionally, the videoscope may further include a color adjustment data transmitter configured to transmit, to the processor, information on the color adjustment data used by the color adjuster.

According to aspects of the present invention, further provided is an electronic endoscope apparatus which includes a processor and a videoscope connected with the processor. The videoscope is configured to generate a picture signal for an image of an observed object through color adjustment using color adjustment data and to transmit the generated picture signal to the processor. The processor includes a light source configured to emit light for illuminating the observed object, a determining unit configured to determine whether the color adjustment data used by the videoscope is adapted to the light source, a color conversion data acquiring unit configured to acquire color conversion data adapted to the color adjustment data when the determining unit determines that the color adjustment data is not adapted to the light source, and a color converter configured to perform color conversion for the picture signal transmitted by the videoscope based on the color conversion data acquired by the color conversion data acquiring unit.

According to aspects of the present invention, further provided is an electronic endoscope apparatus which includes a processor and a videoscope connected with the processor. The videoscope is configured to illuminate an observed object with light supplied by a light source of a processor. The videoscope includes an image sensor configured to generate a color image signal for an image of the observed object formed under illumination with the light, a color adjustment data acquiring unit configured to acquire color adjustment data adapted to the light source from the processor, a color adjustment data storage configured to store thereon the color adjustment data acquired by the color adjustment data acquiring unit, and a color adjuster configured to convert the color image signal generated by the image sensor into a picture signal through color adjustment using the color adjustment data stored on the color adjustment data storage.

According to aspects of the present invention, further provided is an electronic endoscope apparatus which includes a processor and a videoscope connected with the processor. The videoscope is configured to generate a picture signal for an image of an observed object through color adjustment using color adjustment data and to transmit the generated picture signal to the processor. The processor includes a light source configured to emit light for illuminating the observed object, a determining unit configured to determine whether the color adjustment data used by the videoscope is adapted to the light source, a color conversion data acquiring unit configured to acquire color conversion data adapted to the color adjustment data when the determining unit determines that the color adjustment data is not adapted to the light source, and a color converter configured to perform color conversion for the picture signal transmitted by the videoscope based on the color conversion data acquired by the color conversion data acquiring unit. The videoscope includes an image sensor configured to generate a color image signal for the image of the observed object formed under illumination with the light supplied by the light source of the processor, a color adjustment data acquiring unit configured to acquire color adjustment data adapted to the light source from the processor, a color adjustment data storage configured to store thereon the color adjustment data acquired by the color adjustment data acquiring unit, and a color adjuster configured to convert the color image signal generated by the image sensor into a picture signal through color adjustment using the color adjustment data stored on the color adjustment data storage.

BRIEF DESCRIPTION OF THE ACCOMPANYING DRAWINGS

FIG. 5 is a data table for color conversion previously stored on an EEPROM within the processor in the first embodiment according to one or more aspects of the present invention.

FIG. 7 is a data table for color adjustment previously stored on an EEPROM within a videoscope in a second embodiment according to one or more aspects of the present invention.

FIG. 10 is a block diagram of an electronic endoscope apparatus in a modification according to one or more aspects of the present invention.

DETAILED DESCRIPTION OF THE EMBODIMENTS

It is noted that various connections are set forth between elements in the following description. It is noted that these connections in general and, unless specified otherwise, may be direct or indirect and that this specification is not intended to be limiting in this respect.

First Embodiment

Hereinafter, an electronic endoscope apparatus in a first embodiment according to aspects of the present invention will be described with reference to the accompanying drawings.

Figure 1:
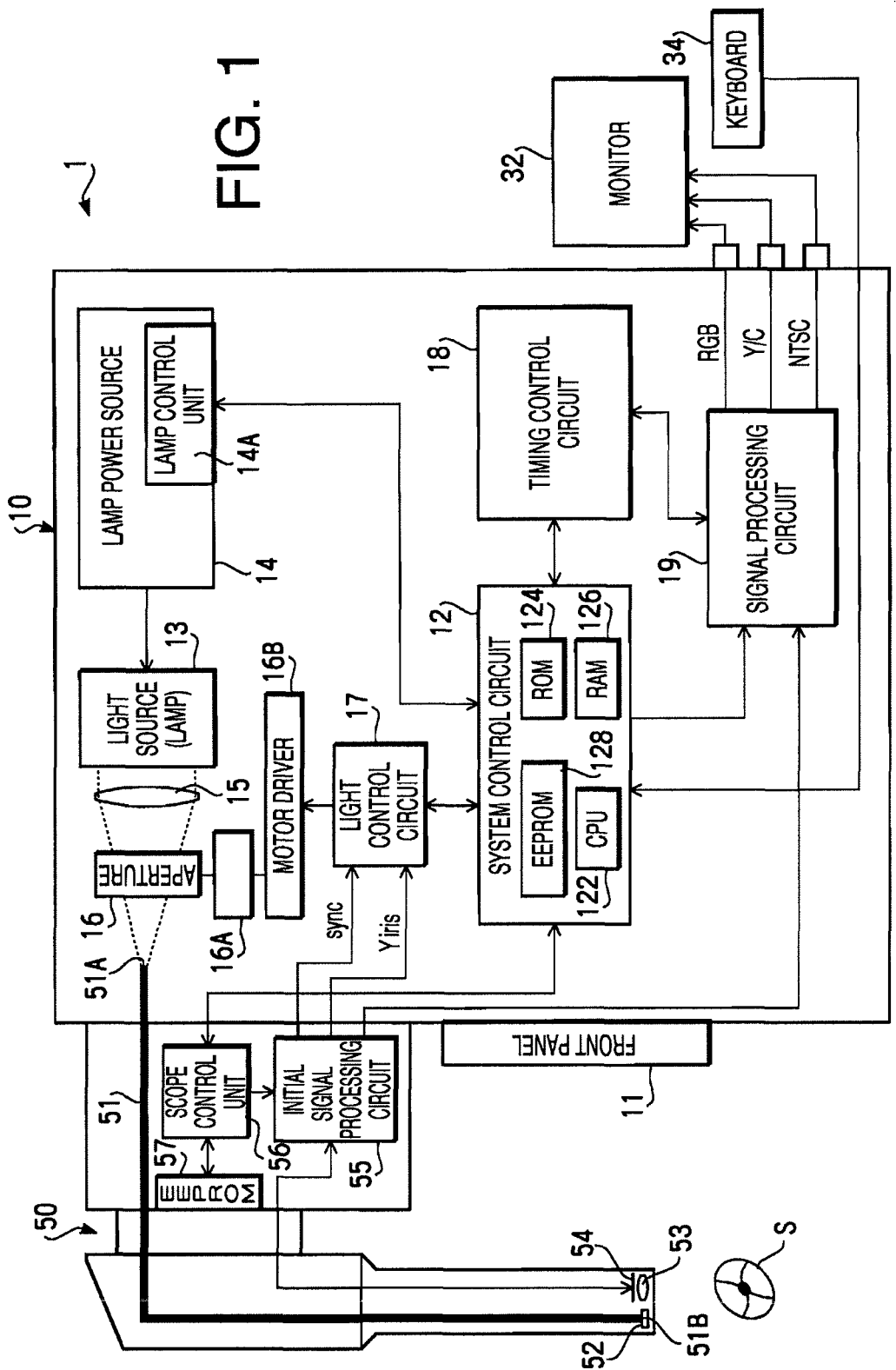
FIG. 1 is a block diagram of an electronic endoscope apparatus in a first embodiment according to one or more aspects of the present invention.

FIG. 1 is a block diagram of an electronic endoscope apparatus 1 in a first embodiment according to aspects of the present invention. The electronic endoscope apparatus 1 is configured to perform inspections and operations of internal organs such as a stomach.

The electronic endoscope apparatus 1 includes a videoscope 50 with a CCD 54 as an image sensor provided at the distal end thereof, a processor 10 configured to process a picture signal received from the videoscope 50, a monitor 32 configured to display thereon an image of an observed region, and a keyboard 34 through which an operator inputs information such as the name of the examined subject into the electronic endoscope apparatus 1. The videoscope 50, the monitor 32 and the keyboard 34 are detachably attached to the processor 10, respectively. When an inspection or an operation is performed with the electronic endoscope apparatus 1, the videoscope 50 is inserted into the body of the examined subject to take an image of the observed region.

The processor 10 includes a front panel 11 provided with various operation buttons, various indicators, and a circuit board configured to control operations of the various buttons and indicators, a system control circuit 12 configured to take overall control of the processor 10, a lamp 13 configured to emit light to be supplied to the videoscope 50, a lamp power source 14 to supply a driving electrical power to the lamp 13, a converging lens 15 configured to converge the light emitted by the lamp 13 and to efficiently introduce the light into a optical fiber bundle 51 of the videoscope 10, a variable aperture 16 configured to control the incident angle of the light introduced into the optical fiber bundle 51 so as to adjust the intensity of the light incident onto the observed region, a light control circuit 17 configured to generate a control signal for the variable aperture 16 based on a brightness signal received from the videoscope 50 and the control by the system control circuit 12, a timing control circuit 18 configured to generate clock pulses and to supply the clock pulses to the system control circuit 12, and a signal processing circuit 19 configured to subject the picture signal received from the videoscope 50 to predetermined processing.

The system control circuit 12 has a CPU 122 configured to perform various control processes for the electronic endoscope apparatus 1, a ROM 124 configured to store various programs and data required for controlling the processor 10, a RAM 126 to temporarily store data used for a process being executed by the CPU 122, and an EEPROM 128 configured to previously store data regarding below-mentioned color conversion. The variable aperture 16 is provided with a motor 16A configured to drive the aperture and a motor driver 16B configured to generate a driving current applied to the motor 16A in accordance with the control signal issued by the light control circuit 17, so that the aperture can be controlled by the control signal from the light control circuit 17. Further, the lamp power source 14 includes a lamp control unit 14A configured to control a current to be supplied to the lamp based on the control signal issued by the system control circuit 12.

The videoscope 50 includes an optical fiber bundle 51 configured to transmit light supplied from the processor 10 up to the distal end of the videoscope 50 placed near the observed region at the time of inspection using the endoscope, a light distribution lens 52 that is a diffusing lens placed immediately behind a light outlet end 51B of the optical fiber bundle 51, an objective lens 53 configured to converge light reflected by the observed region and to form an image of the observed region on a light receiving surface of the CCD 54 provided at the distal end of the videoscope 50, the CCD 54 configured to generate an image signal based on the image of the observed region formed on the light receiving surface, an initial signal processing circuit 55 configured to subject the image signal generated by the CCD 54 to predetermined processing, an EEPROM 57 configured to previously store thereon characteristics of the videoscope (such as the number of pixels) and the below-mentioned data regarding color adjustment (color adjustment data), and a scope control unit 56 configured to take overall control of the videoscope 50.

In the electronic endoscope apparatus 1 of the first embodiment, a halogen lamp is utilized as a light source light source 13 incorporated in the processor 10. Further, the videoscope 50 is designed just for existing xenon lamps.

After the operator turns on a lighting switch (not shown) provided on the front panel 11, the system control circuit 12 controls the lamp power source 14A to supply a current to the lamp 13, and thus the lamp 13 is turned on. The light emitted by the lamp 13 is introduced through the converging lens 15 to a light inlet end 51A of the optical fiber bundle 51 provided within the videoscope 50. Thereafter, the light is transmitted through the optical fiber bundle 51 and emitted from the light outlet end 51B. Then, the observed region S is illuminated with the light emitted from the light outlet end 51B. A part of the light directed to the observed region S is reflected by the observed region S and returns to the distal end of the videoscope 50.

A part of the light incident onto the observed region S is reflected back to the distal end of the videoscope 50, and thereafter reaches the light receiving surface of the CCD 54 through the objective lens 53. Thereby, the image of the observed region S is formed on the light receiving surface of the CCD 54. In the first embodiment, a single-plate simultaneous color imaging method is employed as a color imaging method. The light receiving surface of the CCD 54 has complementary color filters (not shown) each of which is disposed thereon to correspond to each pixel of the light receiving surface. Each of the complementary color filters is formed with color elements of Yellow (Ye), Cyan (Cy), Magenta (Mg), and Green (G) arranged in a checkered pattern. The CCD 54 generates, through photoelectric conversion, image signals for the image of the observed region S that correspond to the light intensity of light transmitted through the complementary color filters. Thereafter, the image signals are sequentially read out on a frame-by-frame basis or a field-by-field basis, at intervals of a predetermined time period, in accordance with a color difference line sequential signal method. From an interline transfer CCD employed in the first embodiment, a frame (field) of image signals is read out sequentially at intervals of 1/30 seconds (1/60 seconds) to correspond to a vertical synchronization frequency of an NTSC method, and then transmitted to the initial signal processing circuit 55.

As described below, the initial signal processing circuit 55 applies various kinds of processes, including a color adjustment process, to the color image signals generated by the CCD 54 to generate picture signals containing brightness signals and color difference signals. Further, the initial signal processing circuit 55 includes a CCD driver (not shown), which is configured to issue a driving signal for driving the CCD 54 to the CCD 54. The picture signals generated by the initial signal processing circuit 55 are transmitted to the signal processing circuit 19. Further, the brightness signals contained in the image signals are transmitted to the light control circuit 17. Additionally, synchronization signals are transmitted from the initial signal processing circuit 55 to the light control circuit 17 at intervals of a predetermined time period in synchronization with a frame (field) of brightness signals sequentially sent to the light control circuit 17.

The signal processing circuit 19 performs predetermined processes, including a below-mentioned color conversion process, for the picture signals transmitted by the initial signal processing circuit 55. The picture signals processed are transmitted to the monitor 32 as video signals such as NTSC composite signals, Y/C separation signals (S-video signal), and RGB separation signals. Thus, the image of the observed region S is displayed on the monitor 32.

The CPU 122 provided in the system control circuit 12 takes overall control of the processor 10 and sends a control signal to each circuit such as the light control circuit 17, the lamp control unit 14A, and the signal processing circuit 19. The timing control circuit 18 transmits a clock pulse for controlling the timing of signal processing to each circuit within the processor 10. Further, the synchronization signal accompanying the video signal is transmitted to the signal processing circuit 19. Moreover, the ROM 124 provided in the system control circuit 12 previously stores thereon various programs for controlling the processor 10 and data regarding the characteristics of the lamp 13. Further, the EEPROM 128 provided in the system control circuit 12 previously stores thereon data regarding the below-mentioned color conversion.

The aperture 16, placed between the light inlet end 51A of the optical fiber bundle 51 and the converging lens 15, is opened and closed by driving the motor 16A, as described above. In the first embodiment, the light intensity of the light passing through the aperture 16, namely, the light intensity of the light incident onto the observed region S is controlled by the light control circuit 17 as a Digital Signal Processor (DSP). The brightness signal (sync) outputted from the initial signal processing circuit 55 is converted into a digital brightness signal by an A/D converter (not shown). After that, the digital brightness signal is inputted into the light control circuit 17. Based on the digital brightness signal, a control signal is transmitted from the light control circuit 17 to the motor driver 16B, and thus the motor 16A is driven by the driving current supplied from the motor driver 16B. Thereby, the aperture 16 is opened to a predetermined angle.

The scope control unit 56 provided within the videoscope 50 is adapted to control the initial signal processing circuit 55 and to read out data stored on the EEPROM 57. When the videoscope 50 is joined with the processor 10, data communication is performed between the scope control unit 56 and the system control circuit 12. Through the data communication, data regarding the type and/or the characteristics of the scope are transmitted from the scope control unit 56 to the system control circuit 12. Further, data regarding the characteristics of the lamp (including the type and/or the model number of the lamp) is transmitted from the system control circuit 12 to the scope control unit 56.

The front panel 11 has a setting switch (not shown) provided thereon to set a reference brightness value as a reference for automatic light control. A signal corresponding to the value set by the operator through the setting switch is transmitted to the system control circuit 12. The reference brightness value is temporarily stored on the RAM 126, and as required transferred from the system control circuit 12 to the light control circuit 17. Additionally, when a key operation is performed through the keyboard 34 to display, on the monitor 32, textual information such as information on the patient, a signal corresponding to the operation through the keyboard 34 is inputted into the system control circuit 12. Based on the signal inputted, a character signal is superimposed on the picture signal at the signal processing circuit 19.

Figure 2:
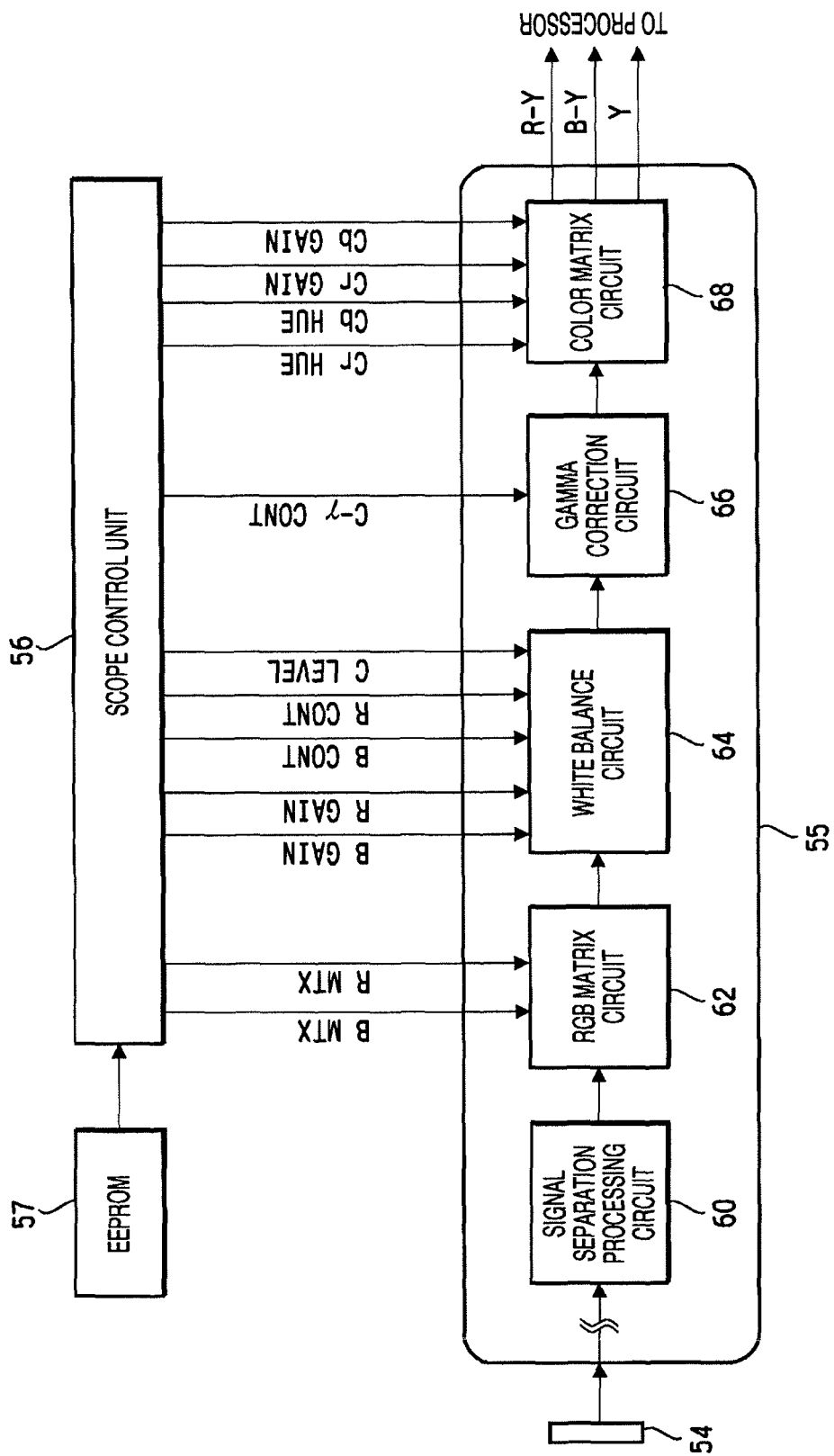
FIG. 2 is a diagram showing in detail a configuration of an initial signal processing circuit within a videoscope in the first embodiment according to one or more aspects of the present invention.
Figure 3:
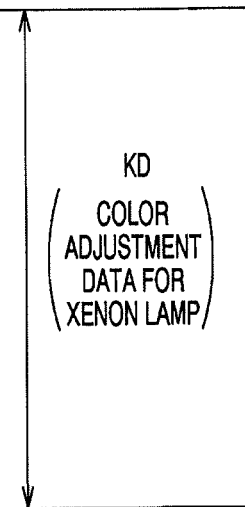
FIG. 3 is a data table for color adjustment previously stored on an EEPROM within the videoscope in the first embodiment according to one or more aspects of the present invention.

FIG. 2 shows in detail a configuration of the initial signal processing circuit 55. FIG. 3 shows a data table as to the color adjustment previously stored on the EEPROM 57. In the first embodiment, since the videoscope 50 is designed just for a xenon lamp, only color adjustment data (KD), which is data for implementing color adjustment suitable for an image taken with the xenon lamp as a light source, is stored in the addresses E000h to E00Bh on the EEPROM 57.

Processes such as an amplification process are applied to the image signal read out from the CCD 54 of a complementary color checkered color difference line sequential signal method at a processing circuit (not shown) within the initial signal processing circuit 55. Thereafter, the image signal is transmitted to a signal separation processing circuit 60. In the signal separation processing circuit 60, image signals read out from each predetermined line thereof are separated into brightness signals Ya and color difference signals (CR, CB). It is noted that the color difference signals (CR, CB) separated have an approximate relationships with primary color signals (R, G, B) "CR≅2R−G and CB≅2B−G." The image signals separated are transmitted to an RGB matrix circuit 62.

In the RGB matrix circuit 62, based on the brightness signals Ya and the color difference signals (CR, CB) that are separated from the image signals generated by the CCD 54, the primary color signals, i.e., a red signal (R), a green signal (G), and a blue signal (B) are obtained from the following equations:

$$R = CR + \alpha \cdot (Ya - CB) \quad (1)$$

$$B = CB + \beta \cdot (Ya - CR) \quad (2)$$

$$G = Ya - CR - CB \quad (3)$$

where the values α and β represent values of data signals "RMTX" and "BMTX," respectively, which are transmitted from the scope control unit 56 that has read out the data regarding color adjustment (the color adjustment data) from the EEPROM 57. The primary color signals R, G and B generated based on the above equations (1) to (3) are transmitted to a white balance circuit 64.

The white balance circuit 64 takes gain control of the signals R and B among the primary color signals. In an initial setting of the electronic endoscope, gain values for R and B are determined based on initial gain data signals "RGAIN" and "BGAIN," respectively, which are transmitted from the scope control unit 56. The "RGAIN" and "BGAIN" are data included in the color adjustment data read out form the EEPROM 57. The values vary depending on the type of a lamp for which the videoscope 50 is adapted. In the first embodiment, the videoscope 50 is adapted to the xenon lamp. Therefore, gain values are set which are suitable for the gain control of the picture signal captured with the xenon lamp. Meanwhile, at the time of observation, the white balance circuit 64 takes gain control based on gain data signals "RCONT" and "BCONT" transmitted from the scope control unit 56. Furthermore, the white balance circuit 64 takes gain control of the color signal C as well. In this case, the gain value is a gain data signal "CLEVEL" transmitted from the scope control unit 56. The primary color signals, to which the white balance adjustment has been applied, are transmitted to a gamma correction circuit 66.

The gamma correction circuit 66 performs gamma correction. At this time, a gamma characteristic curve is formed in accordance with values of a gamma characteristic data signal "C-γ CONT" which is sent by the scope control unit 56. The corrected signal, to which the gamma correction has been applied, is transmitted to the color matrix circuit 68. The color matrix circuit 68 generates the brightness signal Y and the color difference signals Cb (=B−Y) and Cr (=R−Y) as picture signals based on the primary color signals R, G, and B. For the color difference signals Cb and Cr, their color phases with respect to hue are adjusted based on phase control data signals "CbHUE" and "CrHUE" transmitted by the scope control unit 56, respectively. Further, the output levels of the color difference signals Cb and Cr are adjusted based on output level adjusting signals "CbGAIN" and "CrGAIN" transmitted by the scope control unit 56, respectively. The brightness signal Y, and the color difference signals Cb and Cr are sent to the processor 10.

The data signals transmitted from the scope control unit 56 to the initial signal processing circuit 55 conform to the color adjustment data previously stored on the EEPROM 57. The color adjustment data are stored in predetermined addresses on the EEPROM 57 (see FIG. 3). The data signals for each color adjustment process have values specific to the characteristics of the type of a lamp for which the videoscope 50 is adapted. For example, the data signals "RGAIN" and "BGAIN" of the color adjustment data KD for the xenon lamp have nearly equal gain values since light emitted by the xenon lamp is close to white light. Meanwhile, with respect to initial gain data signals "RGAIN" and "BGAIN" of color adjustment data HD for a halogen lamp, the value of "RGAIN" is smaller than the value of "BGAIN" since light emitted from halogen lamp is close to yellow light.

In the videoscope 50 of the first embodiment, only the color adjustment data for the xenon lamp is provided and stored as the color adjustment data KD for the xenon lamp. Therefore, even though a different type of lamp (for example, a halogen lamp) is used in the processor 10, the color adjustment data KD for the xenon lamp is read out from the EEPROM 57, and the data signals such as "RGAIN" and "CbHUE," which are suitable for color adjustment in the case where the xenon lamp is employed as a light source, are transmitted from the scope control unit 56 to the initial signal processing circuit 55. Consequently, in this case, the type of the lamp actually used is not consistent with the type of the lamp conforming to the color adjustment data to bemused for the color adjustment. Hence, the color adjustment performed in the initial signal processing circuit 55 is inappropriate, and thus an image is obtained with a different color tone from an image obtained by illuminating the observed region with standard light. Further, the data signal outputted from the scope control Unit 56 is converted into an analog signal by a D/A converter (not shown), and thereafter transmitted to the initial signal processing circuit 55.

In the first embodiment, since the videoscope 50 is designed just for the xenon lamp, only the color adjustment data KD for the xenon lamp is stored on the EEPROM 57. The color adjustment data to be stored in the videoscope 50 varies depending on the type of a lamp for which the videoscope is adapted. For example, for a videoscope designed for a metal halide lamp, color adjustment data MD for the metal halide lamp is stored on the EEPROM 57. Similarly, for a videoscope designed for a halogen lamp, the color adjustment data HD for the halogen lamp is stored on the EEPROM 57. In the case of a videoscope which conforms to plural types of lamps, plural sets of color adjustment data are previously stored on the EEPROM 57. In this case, depending on data about lamp characteristics which is transmitted from the system control circuit 12 of the processor 10 to the scope control unit 56, color adjustment data conforming to the type of the lamp 13 to be used, among the plural sets of color adjustment data previously stored, is read out from the EEPROM 57 by the scope control unit 56, and used for the color adjustment.

Figure 6:
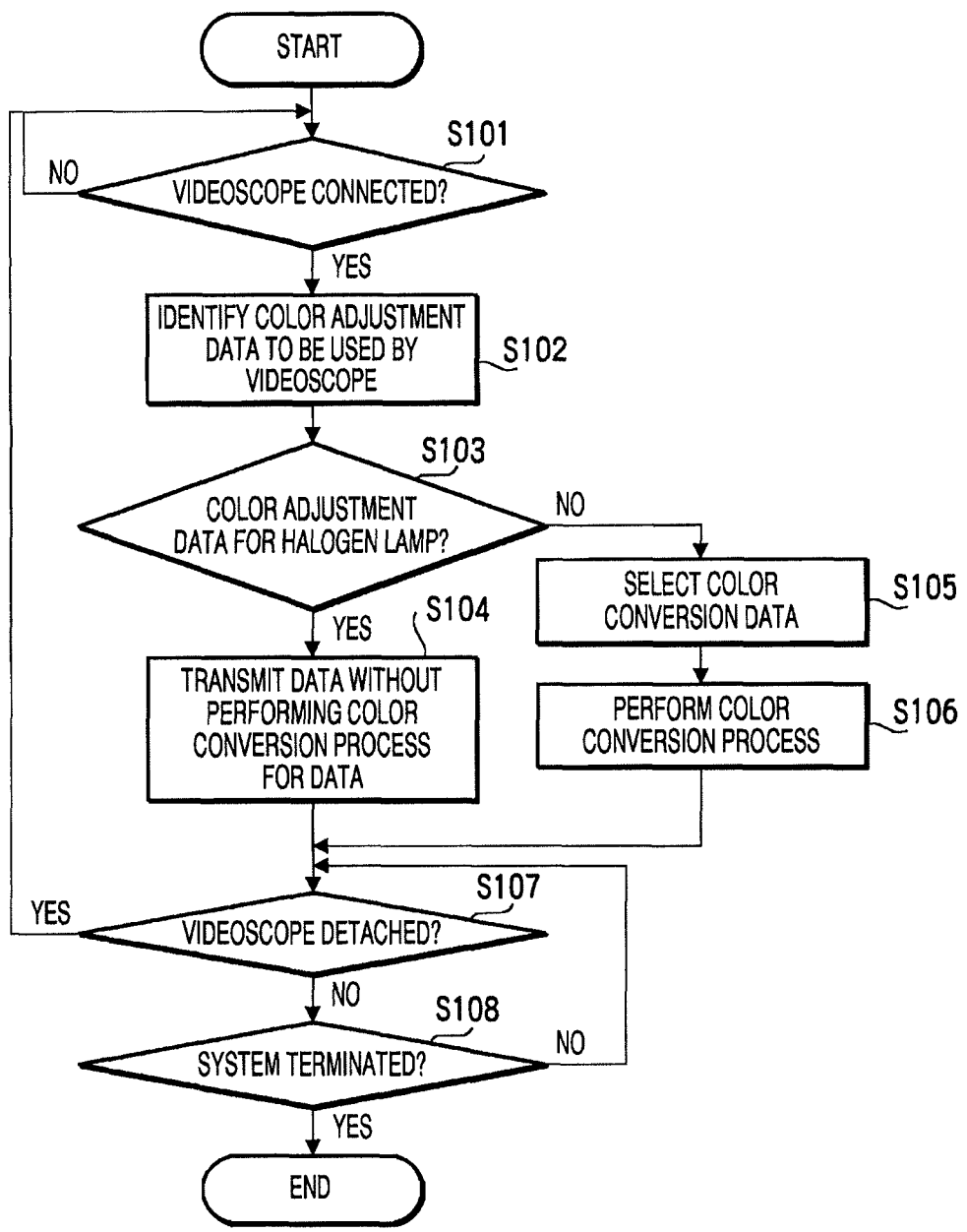
FIG. 6 is a flowchart showing a procedure of a color conversion process to be executed by the processor in the first embodiment according to one or more aspects of the present invention.

Subsequently, referring to FIGS. 4 to 6, a color conversion process to be executed by the processor 10 will be described. As described above, in the first embodiment, the type of the lamp (the halogen lamp) provided to the processor 10 does not correspond to the type of the lamp (the xenon lamp) that conforms to the color adjustment data to be used for the color adjustment process performed by the initial signal processing circuit 55 of the videoscope 50. Therefore, an inappropriate color conversion is performed, and consequently, the color tone of the picture signal outputted from the initial signal processing circuit 55 is different from the actual color tone obtained in the case where the observed region is illuminated with the standard light. The color conversion processing in the first embodiment is a process adapted to readjust (or perform the color conversion for) the color tone of the picture signal for which the color conversion process has been performed based on the color adjustment data conforming to the lamp of which the type is different from that of an actually used lamp, and to acquire an picture signal with the same color tone as obtained when the observed region is illuminated with the standard light.

Figure 4:
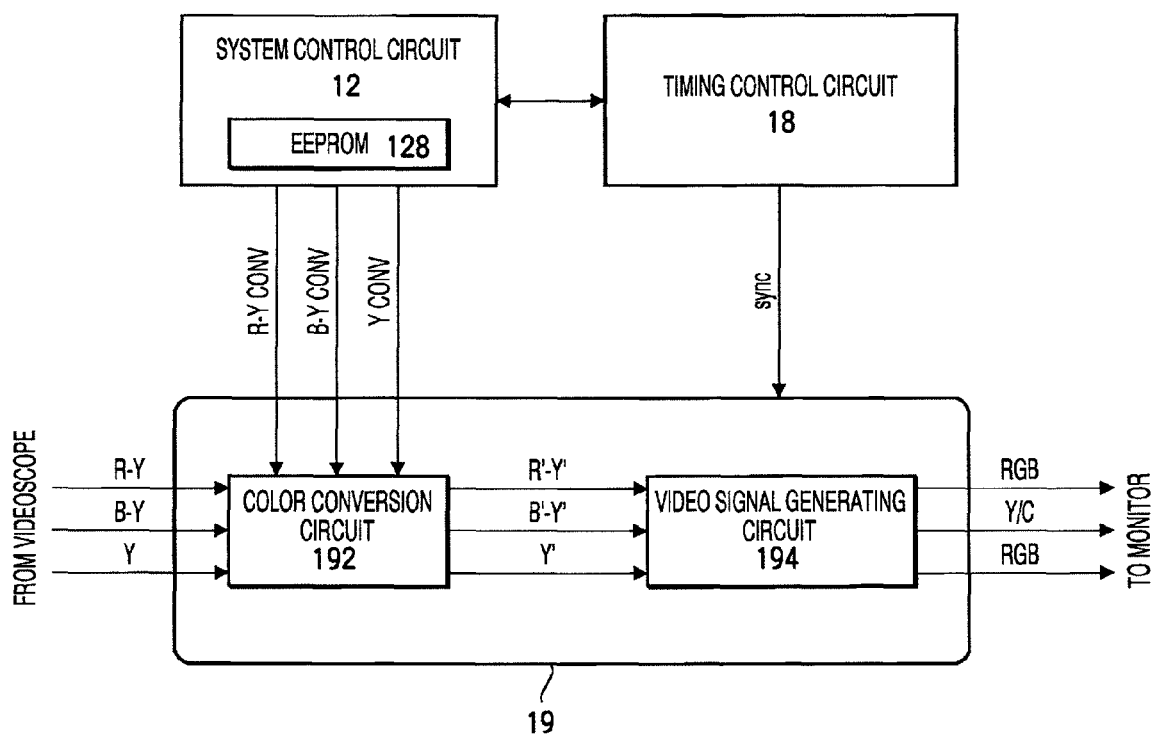
FIG. 4 is a diagram showing in detail a configuration of a signal processing circuit within a processor in the first embodiment according to one or more aspects of the present invention.

FIG. 4 is a diagram showing in detail a configuration of the signal processing circuit 19. The signal processing circuit 19 includes a color conversion circuit 192 and a video signal generating circuit 194. The color conversion circuit 192 is configured to perform color conversion to convert a picture signal transmitted by the initial signal processing circuit 55 into a picture signal with an original color tone when the videoscope 50 connected with the processor 10 does not conform to a type of lamp loaded in the processor 10 (namely, the initial signal processing circuit 55 perform the color adjustment process with color adjustment data that conforms to a different type of lamp). Further, the video signal generating circuit 194 is configured to add a synchronization signal supplied from the timing control circuit 18 to the picture signal with an appropriate color tone corrected by the color conversion circuit 192, and to generate video signals such as an NTSC composite signal, a Y/C separation signal, and an RGB separation signal to be transmitted to the monitor 32.

The picture signal (the brightness signal Y and color difference signals B−Y and R−Y) transmitted by the initial signal processing circuit 55 of the videoscope 50 is inputted into the color conversion circuit 192. Further, from the system control circuit 12, data signal "CONV" to be used in the color conversion process is transmitted to the color conversion circuit 192. The data signal "CONV" is three-dimensional matrix (3×3 matrix) data to generate picture signals with an appropriate color tone (a brightness signal Y' and color difference signals B'−Y' and R'−Y') based on the picture signals (the brightness signal Y and the color difference signals B−Y and R−Y) transmitted by the initial signal processing circuit 55.

On the EEPROM 128 included in the system control circuit 12, there are previously stored plural kinds of color conversion data "CONV," which conform to the color adjustment process performed by the initial signal processing circuit 55 of the videoscope 50 (specifically, which conform to the type of a lamp for which color adjustment data to be used in the color adjustment process is adapted). FIG. 5 shows a data table on the color conversion, which data table is previously stored on the EEPROM 128. In FIG. 5, a data group represented by an abbreviation "HD/KD" is a data group to be applied to the color conversion process to be performed when the color adjustment process conforming to the xenon lamp is applied to the image signal taken with the halogen lamp. Each data "CONV nm (CONV 11 to 33)" denotes an element of a 3×3 matrix. In addition, a data group represented by an abbreviation "HD/MD" is a data group to be applied to the color conversion process to be performed when the color adjustment process conforming to the metal halide lamp is applied to the image signal taken with the halogen lamp. The system control circuit 12 reads out from the EEPROM 128 the color conversion data "CONV" which conforms to the color adjustment process to be performed by the initial signal processing circuit 55 when the color adjustment process adapted to an actually used lamp is not performed by the initial signal processing circuit 55 of the videoscope 50. Thereafter, the system control circuit 12 transmits the color conversion data "CONV" to the color conversion circuit 192.

The color conversion circuit 192 converts the picture signals (Y, B−Y, R−Y) received from the initial signal processing circuit 55 of the videoscope 50 based on the color conversion data "CONV" supplied from the system control circuit 12, and then issues to the video signal generating circuit 194 the corrected picture signals (Y', B'−Y', R'−Y') with appropriate color tones corrected through the color conversion. Thereby, an observed image is displayed on the monitor 32 with an appropriate color tone, namely, with the same color tone as directly observed with the naked eyes under illumination with the standard light. It is noted that, in the endoscope apparatus of the first embodiment, average daylight of a color temperature of 6774K is employed as standard light. Further, the standard light is not limited to the light of the color temperature. The standard light can be arbitrarily set as a relative spectral distribution that is a standard for determining the color tone of the observed image to be displayed. It is noted that the term "standard light" may be any standard light such as standard light defined in the Japanese Industrial Standard JIS-Z-8701 and standard light defined by the International Commission on Illumination (CIE), and is not limited to those definitions.

Subsequently, referring to FIG. 6, the color conversion process to be executed by the processor 10 will be described in detail. FIG. 6 is a flowchart showing a procedure of the color conversion process.

First, in S101, the system control circuit 12 of the processor 10 detects whether the videoscope 50 is connected with the processor 10 (S101). Specifically, the system control circuit 12 detects whether the videoscope 50 is connected by referring to a detection signal transmitted from a videoscope detection unit (not shown) provided at a videoscope connecting portion to the system control circuit 12. When not detecting that the videoscope 50 is connected with the processor 10 (S101: No), the system control circuit 12 keeps monitoring whether the videoscope 50 is connected with the processor 10 until the connection between the videoscope 50 and the processor 10 is detected. When the system control circuit 12 detects that the videoscope 50 is connected with the processor 10 (S101: Yes), the system control circuit 12 performs communication with the videoscope control unit 56, and acquires information on the videoscope 50. The acquired information on the videoscope 50 contains information on the type of the videoscope 50 and information on the color adjustment data to be used by the videoscope 50 (e.g., an identification number of the color adjustment data and a type of a lamp for which the color adjustment data is adapted). Based on the aforementioned kinds of information, the system control circuit 12 identifies the color adjustment data to be used by the videoscope 50 (S102).

At this time, when the videoscope 50 is configured to have plural kinds of color adjustment data, the system control circuit 12 issues a request for information on lamp characteristics. In response to the request issued by the system control circuit 12, information on the type of a lamp to be used by the processor 10 is transmitted from the system control circuit 12 to the scope control unit 56. Then, the scope control unit 56 selects color adjustment data suitable for the light source to be used as data to be used for the color adjustment process from the plural kinds of color adjustment data stored in the videoscope 50. Then, the scope control unit 56 transmits the selected color adjustment data to the system control circuit 12. Thereby, the system control circuit 12 can identify the color adjustment data to be used among the plural kinds of color adjustment data stored in the videoscope 50.

Next, it is determined whether the color adjustment data identified in S102 to be used by the videoscope 50 is adapted to the halogen lamp used in the processor 10 (S103). When it is determined that the color adjustment data is adapted to the halogen lamp (S103: Yes), the system control circuit 12 controls the color conversion circuit 192 to transmit, to the video signal generating circuit 194, the picture signal received from the videoscope 50 without performing the color conversion process for the picture signal received (S104). Further, when it is determined that the color adjustment data is not adapted to the halogen lamp (S103: No), the system control circuit 12 selects color conversion data corresponding to the color adjustment data to be used by the videoscope 50 from the various kinds of color conversion data previously stored on the EEPROM 128 (S105). In the first embodiment, the halogen lamp is used as a light source, and the color adjustment data adapted to the xenon lamp is used by the videoscope 50. Hence, the color conversion data "HD/KD" complying with the above conditions is selected. Then, the system control circuit 12 transmits to the color conversion circuit 192 the color conversion data selected, and then controls the color conversion circuit 192 to perform the color conversion process for the picture signal received from the videoscope 50 using the color conversion data selected (S106). Next, it is determined whether the videoscope 50 is detached from the processor 10 (S107) and whether the system (the electronic endoscope apparatus 1) is terminated (S108). Detachment of the videoscope 50 from the processor 10 is detected by referring to the aforementioned detection signal transmitted from the videoscope detection unit to the system control circuit 12. When the detachment of the videoscope 50 is detected (S107: Yes), the present process goes back to S101, in which the system control circuit 12 keeps monitoring whether the videoscope 50 is re-connected with the processor 10 (S101). When the system is terminated (S108: Yes), the present process is as well terminated.

Thus, in the first embodiment, when the videoscope 50 is connected with the processor 10, the processor 10 identifies the color adjustment data to be used by the videoscope 50. Then, the processor 10 selects the color conversion data corresponding to the color adjustment data to be used from the plural kinds of color conversion data stored in the processor 10. After that, the processor 10 performs the color conversion process for the picture signal taken by the videoscope 50 using the color conversion data selected. Thereby, even though the color adjustment process performed by the videoscope 50 does not conform to the light source actually used, an image with the same hue as directly observed with the standard light is always displayed on the monitor 32. Thus, the color reproducibility can be improved. Further, since the electronic endoscope apparatus 1 is configured to perform the color conversion process depending on specifications and operations of the videoscope 50 at the side of the processor 10, existing videoscopes 50 are effectively utilized.

The Second Embodiment

Subsequently, a second embodiment according to aspects of the present invention will be explained. A configuration of an electronic endoscope apparatus in the second embodiment is substantially identical to that in the first embodiment. However, data areas in the second embodiment which are secured on the EEPROM 57 provided within the videoscope 50 and the EEPROM 128 provided within the system control circuit 12 of the processor 10, and data stored on the EEPROM 57 and the EEPROM 128 are different from those in the first embodiment.

FIG. 7 shows memory areas for the color adjustment data that are assigned on the EEPROM 57 of the videoscope 50 in the second embodiment, and data stored in the memory areas in an initial state. In the same manner as the first embodiment (see FIG. 3), the color adjustment data for the xenon lamp "KD" is stored in addresses E000h to E00Bh on the EEPROM 57. In the second embodiment, there are secured further data areas (E100h to E10Bh and E200h to E20Bh) in which two sets of color adjustment data are stored. Thus, in the second embodiment, it is possible to store up to three sets of color adjustment data In a state shown in FIG. 3, there is no data written in the data areas E100h to E10Bh and E200h to E20Bh.

In the second embodiment, the processor 10 has the color adjustment data adapted to the light source loaded in the processor 10. Thereby, when the videoscope 50 does not have the color adjustment data adapted to the light source loaded in the processor 10, the color adjustment data is supplied from the processor 10 to the videoscope 50. In the second embodiment, the color adjustment data adapted to the light source loaded in the processor 10 is previously stored in memory areas (not shown) secured on the EEPROM 128 of the system control circuit 12 to store the color adjustment data.

Figure 8:
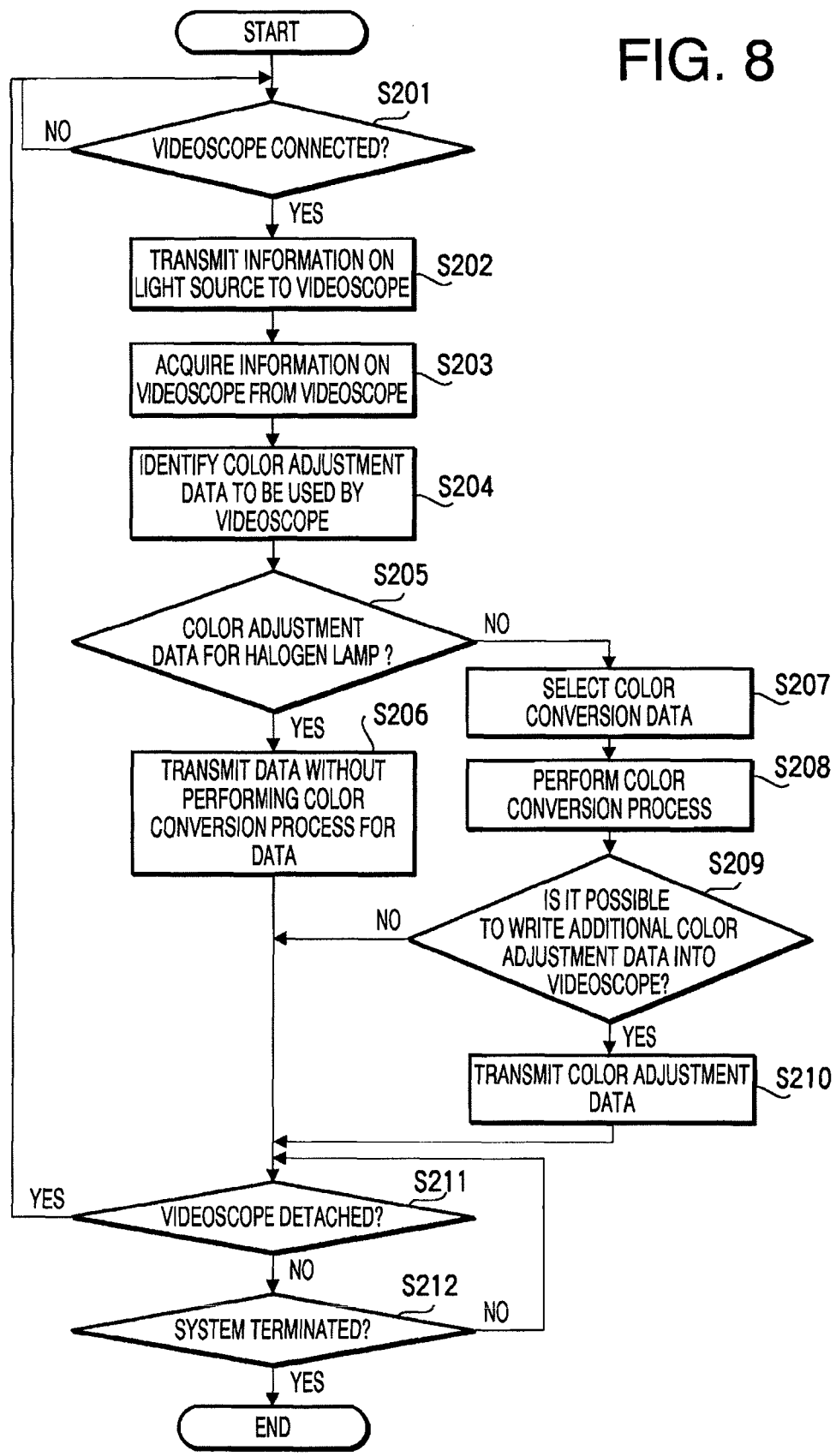
FIG. 8 is a flowchart showing a procedure of a process for color conversion and transmission of color adjustment that is to be executed by a processor in the second embodiment according to one or more aspects of the present invention.

Next, referring to FIG. 8, a description will be given to explain a process for color conversion process and transmission of color adjustment that is to be executed by the processor 10 in the second embodiment. Initially, in S201, the system control circuit 12 of the processor 10 periodically monitors whether the videoscope 50 is connected with the processor 10 until the connection of the videoscope 50 with the processor 10 is detected (S201). The operation is the same as the operation in S101 of the first embodiment. When the connection of the videoscope 50 with the processor 10 is detected (S201: Yes), the system control circuit 12 performs communication with the scope control unit 56 to transmit information on the characteristics of the lamp loaded in the processor 10 to the scope control unit 56 in response to a request issued by the scope control unit 56 (S202).

Subsequently, the processor 10 (the system control circuit 12) issues a request for information on the videoscope 50 to the scope control unit 56, and acquires the information (S203). The acquired information on the videoscope 50 contains information on the type of the videoscope 50 and information on the color adjustment data to be used by the videoscope 50 (e.g., an identification number of the color adjustment data and a type of a lamp for which the color adjustment data is adapted). Based on the aforementioned kinds of information, the system control circuit 12 identifies the color adjustment data to be used by the videoscope 50 (S204).

Next, it is determined whether the color adjustment data identified in S204 to be used by the videoscope 50 is adapted to the halogen lamp used in the processor 10 (S205). When the color adjustment data to be used is adapted to the halogen lamp (S205: Yes), the system control circuit 12 controls the color conversion circuit 192 to transmit, to the video signal generating circuit 194, the picture signal received from the videoscope 50 without performing the color conversion process for the picture signal received (S206). Meanwhile, when the color adjustment data to be used is not adapted to the halogen lamp (S205: No), the system control circuit 12 selects the color conversion data corresponding to the color adjustment data to be used by the videoscope 50 from the various kinds of color conversion data previously stored on the EEPROM 128 (S207). In the second embodiment, the halogen lamp is used as a light source, and the color adjustment data adapted to the xenon lamp is used by the videoscope 50. Therefore, the color conversion data "HD/KD" complying with the above conditions is selected. Then, the system control circuit 12 transmits the selected color conversion data to the color conversion circuit 192, and controls the color conversion circuit 192 to perform the color conversion process using the selected color conversion data for the picture signal received from the videoscope (S208).

At this time, since the videoscope 50 does not use the color adjustment data for the halogen lamp, the system control circuit 12 determines that the videoscope 50 does not have the color adjustment data for the halogen lamp. Further, based on the information on the videoscope 50 acquired in S203, the system control circuit 12 determines whether it is possible to additionally register color adjustment data into the videoscope 50 (S209). When it is determined that it is possible to additionally register color adjustment data into the videoscope 50 (S209: Yes), the system control circuit 12 transmits the color adjustment data for the halogen lamp previously stored on the EEPROM 128 to the scope control unit 56 (S210), and proceeds the present process to S211. When it is determined that it is not possible to additionally register color adjustment data into the videoscope 50 (S209: No), the system control circuit 12 proceeds the present process to S211.

Next, the system control circuit 12 monitors whether the videoscope 50 is detached from the processor 10 (S211) and whether the system is terminated (S212). When detachment of the videoscope 50 from the processor 10 is detected (S211: Yes), the present process goes back to S201, in which the system control circuit 12 keeps monitoring whether the videoscope 50 is re-connected with the processor 10. When the system is terminated (S212: Yes), the present process is as well terminated.

Figure 9:
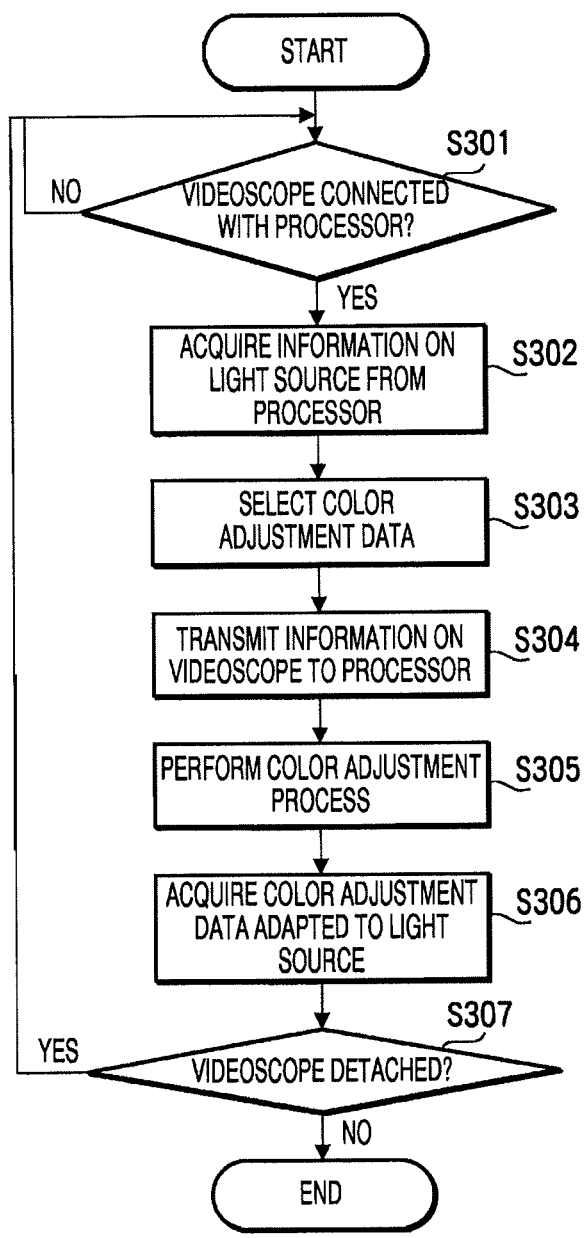
FIG. 9 is a flowchart showing a procedure of a process for extracting color adjustment data and acquiring color adjustment data that is to be executed by the videoscope in the second embodiment according to one or more aspects of the present invention.

Next, with reference to a flowchart shown in FIG. 9, a description will be given to explain a process for extracting the color adjustment data and acquiring the color adjustment data that is to be executed by the videoscope 50 in the second embodiment, will be explained. Initially, in S301, it is determined whether the videoscope 50 is connected with the processor 10 (S301). When it is determined that the videoscope 50 is not connected with the processor 10 (S301: No), the scope control unit 56 keeps monitoring whether the videoscope 50 is connected with the processor 10 until the connection of the videoscope 50 with the processor 10 is detected. When the connection of the videoscope 50 with the processor 10 is detected (S301: Yes), the scope control unit 56 issues a request for the data on the lamp characteristics based on the type of the lamp 13 to the system control circuit 12 of the processor 10, and acquires the data (S302).

Subsequently, in S303, the scope control unit 56 selects color adjustment data adapted to the light source used in the processor 10 as the color adjustment data for the color adjustment process, from the color adjustment data stored on the EEPROM 57, on the basis of the acquired data on the characteristic of the lamp 13 (S303). It is noted that when the color adjustment data adapted to the lamp 13 is not stored on the EEPROM 57, previously specified data (e.g., data stored in a data area of the smallest address number) is selected. In the second embodiment, as illustrated in FIG. 7, the color adjustment data for the xenon lamp "KD" is only stored on the EEPROM 57, the color adjustment data for the xenon lamp "KD" is selected as color adjustment data to be used.

Next, in S304, the scope control unit 56 transmits the information on the videoscope 50 in response to the request from the system control circuit 12 of the processor 10 (S304).

The information on the videoscope 50 transmitted to the system control circuit 12 contains the information on the type of the videoscope 50 and the information on the color adjustment data selected in S302 to be used by the videoscope 50 (e.g., the identification number of the color adjustment data, the type of the lamp for which the color adjustment data is adapted, etc.). The information on the color adjustment data is stored in different areas (not shown) on the EEPROM 57 from the data areas in which the color adjustment data is stored, for example, in association with each color adjustment data stored on the EEPROM 57.

Next, in S305, the scope control unit 56 reads out from the EEPROM 57 the color adjustment data (for the xenon lamp "KD") selected in S303, and transmits the data to the initial signal processing circuit 55. Then, the scope control unit 56 controls the initial signal processing circuit 55 to perform the color adjustment process for the color image signal read out from the CCD 54 using the color adjustment data "KD."

In S306, the scope control unit 56 receives the color adjustment data for the halogen lamp "HD" that is transmitted by the system control circuit 12 of the processor 10 (S210 in FIG. 8), and stores the color adjustment data for the halogen lamp "HD" in color adjustment data storing areas which are vacant on the EEPROM 57.

Thus, according to the second embodiment, even though the videoscope 50 which does not have the color adjustment data adapted to the light source 13 is connected with the processor 10, the processor 10 performs an appropriate color conversion process using the color conversion data conforming to the color adjustment data to be used in the color adjustment process to be performed by the videoscope 50. Thereby, an image of the observed region is displayed on the monitor 32 with the same color tone as observed with naked eyes under illumination with the standard light. Further, according to the second embodiment, when the videoscope 50 can write additional color adjustment data into the videoscope 50, the color adjustment data adapted to the light source 13 can be transmitted to the scope control unit 56 and stored in vacant areas on the EEPROM 57. Therefore, when the videoscope 50 is connected with the processor next time, an appropriate color adjustment process can be carried out using the color adjustment data for the halogen lamp "HD." In this case, since an image conversion process is not required to be executed at the side of the processor 10, it is possible to restrain deteriorating image quality and to reduce a consumed electrical power. Further, once the color adjustment data for the halogen lamp is additionally stored into the videoscope 50, even though thereafter the videoscope 50 is connected with a processor loaded with a halogen lamp that does not have a color conversion circuit, an appropriate color adjustment process can be performed using the added color adjustment data for the halogen lamp.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. For example, the present invention is capable of the following modifications.

In the aforementioned embodiments, the complementary color filters are utilized, and the color difference line sequential signal method is applied as a method for reading out pixel signals. However, RGB primary color mosaic filters may be utilized as substitute for the complementary color filters, and a Bayer method may be applied as substitute for the color difference line sequential signal method. In this case, preferably, the initial signal processing circuit 55 may be configured to conform to the primary color mosaic filters and the Bayer method. Further, a frame sequential imaging method may be applied as an imaging method, as well as the simultaneous imaging method. Further, in the aforementioned embodiments, the NTSC method is utilized as a method for video output to the monitor. However, other methods may be applied. Additionally, the initial signal processing circuit 55 of the videoscope 50 may be configured with no color matrix circuit 68, such that RGB signals are transmitted to the processor 10 without being converted into brightness signals or color difference signals. In this case, the matrix data converts RGB signals into RGB signals.

The type of the lamp is not limited to a xenon lamp, a metal halide lamp, or a halogen lamp. Other lamps such as LED may be utilized. In this case, preferably, the color adjustment data and the color conversion data may be adapted based on the spectroscopic characteristics of the lamp used.

In the aforementioned embodiments, the data signal corresponding to each of the color adjustment data for the xenon lamp KD, the color adjustment data for the metal halide lamp MD, and the color adjustment data for the halogen lamp HD has a value that varies depending on the type of the lamp. However, a predetermined data signal may only have a value that varies depending on the type of the lamp. For example, the gamma characteristic data signal "C-γ CONT" may have a common value among the various lamp types.

Further, in the aforementioned embodiments, the videoscope 50 identifies the type of the used light source based on the information on the characteristics of the light source 13 that is acquired through the communication with the processor 10. However, the videoscope 50 may include a spectrum measuring unit configured to measure spectral characteristics of the light supplied by the processor 10. In this case, the videoscope 50 may include a unit configured to identify the type of the used light source based on the measured spectral characteristics of the light, or the scope control unit 56 may be configured to identify the type of the used light source based on the measured spectral characteristics of the light. For example, as the spectrum measuring unit, a spectrum measuring device may be utilized which is configured with a spectroscopic element 58A (see FIG. 10) such as a prism, and a photo detecting array 58 (see FIG. 10), such as a CCD array and a photodiode array, which is configured with each photo detecting element thereof arranged in a spectroscopic direction. According to such a configuration, it is possible to identify the type of the used light source in accordance with only processes performed at the side of the videoscope 50, without acquiring the information on the characteristics of the light source 13 through the communication with the processor 10. Hence, even though the processor 10 does not have a function to transmit to the videoscope 50 the information on the characteristics of the light source 13, it is possible to identify the type of the light source, select color adjustment data adapted to the light source, and perform an appropriate color adjustment process.

Further, in the second embodiment, a rewritable memory such as an EEPROM of the videoscope 50 has memory areas secured thereon for plural sets of color adjustment data. In addition, the color adjustment data adapted to the light source loaded in the processor 10 can be additionally written into vacant areas of the rewritable memory. However, for instance, there may be memory areas secured on the rewritable memory of the videoscope 50 only for a single set of color adjustment data. In this case, preferably, the color adjustment data acquired from the processor 10 may be overwritten onto the existing data in the memory areas secured.

The present disclosure relates to the subject matter contained in Japanese Patent Application No. P2008-102019, filed on Apr. 10, 2008, which is expressly incorporated herein by reference in its entirety.

What is claimed is:

1. A processor for an electronic endoscope, the processor configured to be connected with a videoscope adapted to generate a color-adjusted picture signal from a color image signal for an image of an observed object through color adjustment using first color adjustment data and to transmit the generated color-adjusted picture signal to the processor, the processor comprising:
   a light source configured to emit light for illuminating the observed object;
   a determiner configured to determine whether or not the first color adjustment data used by the videoscope is adapted to the light source;
   a color conversion data acquirer configured to acquire color conversion data compatible with the first color adjustment data when the determiner determines that the first color adjustment data is not compatible with the light source; and
   a color converter configured to:
   receive the color-adjusted picture signal generated through the color adjustment using the first color adjustment data;
   generate a video signal from the received color-adjusted picture signal by performing color conversion using the color conversion data acquired by the color conversion data acquirer, the color conversion readjusting a color tone of the color-adjusted picture signal generated using the first color adjustment data not compatible with the light source, so as to generate the video signal with the readjusted color tone; and
   transmit the generated video signal to a monitor.

2. The processor according to claim 1, further comprising a color conversion data storage configured to store at least one kind of color conversion data,
   wherein the color conversion acquirer is configured to select and acquire the color conversion data adapted to the first color adjustment data from the at least one kind of color conversion data stored by the color conversion data storage.

3. The processor according to claim 1, further comprising:
   a color adjustment data storage configured to store second color adjustment data configured such that the video scope generates a picture signal for the observed object with an appropriate color tone through the color adjustment using the second color adjustment data; and
   a color adjustment data transmitter configured to transmit, to the video scope, the second color adjustment data stored by the color adjustment data storage.

4. The processor according to claim 1,
wherein the color-adjusted picture signal transmitted by the videoscope has a format in which the picture signal includes a brightness signal and at least two color difference signals, and
wherein the color conversion data is matrix data adapted to convert the picture signal into a picture signal having a format identical to the format of the picture signal.

5. The processor according to claim 1,
wherein the color conversion data is matrix data adapted to convert RGB signals into RGB signals.

6. The processor according to claim 1,
wherein the color conversion data is 3×3 matrix data.

7. The processor according to claim 1,
wherein the color conversion data is adapted to convert the color-adjusted picture signal transmitted by the videoscope into a picture signal with a color tone such as would be attained when the observed object is observed with naked eyes under illumination with standard light.

8. A videoscope configured to connect with the processor according to claim 1, the videoscope further configured to illuminate an observed object with light supplied by a light source of the processor connected with the videoscope, the videoscope comprising:
an image sensor configured to generate a color image signal for an image of the observed object formed under illumination with the light;
a color adjustment data acquirer configured to acquire color adjustment data adapted to the light source from the processor;
a color adjustment data storage configured to store the color adjustment data acquired by the color adjustment data acquirer; and
a color adjuster configured to convert the color image signal generated by the image sensor into a color-adjusted picture signal through color adjustment using the color adjustment data stored by the color adjustment data storage.

9. The video scope according to claim 8,
wherein the color adjustment data storage is a rewritable storage configured to store plural kinds of color adjustment data.

10. The videoscope according to claim 9, further comprising:
a light source identifier configured to identify a type of the light source that supplies the light for illuminating the observed object; and
a color adjustment data selector configured to select the color adjustment data adapted to the light source from the plural kinds of color adjustment data stored by the color adjustment data storage, based on the type of the light source identified by the light source identifier,
wherein the color adjuster is configured to convert the color image signal into the color-adjusted picture signal through the color adjustment using the color adjustment data selected by the color adjustment data selector.

11. The videoscope according to claim 10,
wherein the light source identifier is configured to receive information on the light source from the processor and to identify the type of the light source based on the received information.

12. The videoscope according to claim 10, further comprising a spectrum measurer configured to measure spectral characteristics of the light supplied by the light source,
wherein the light source identifier is configured to identify the type of the light source based on the spectral characteristics measured by the spectrum measurer.

13. The videoscope according to claim 8, further comprising a color adjustment data transmitter configured to transmit, to the processor, information on the color adjustment data used by the color adjuster.

14. An electronic endoscope apparatus, comprising a processor and a videoscope connected with the processor,
wherein the videoscope is configured to generate a color-adjusted picture signal from a color image signal for an image of an observed object through color adjustment using first color adjustment data and to transmit the generated color-adjusted picture signal to the processor,
wherein the processor comprises:
a light source configured to emit light for illuminating the observed object;
a determiner configured to determine whether or not the first color adjustment data used by the videoscope is adapted to the light source;
a color conversion data acquirer configured to acquire color conversion data compatible with the first color adjustment data when the determiner determines that the first color adjustment data is not compatible with the light source; and
a color converter configured to:
receive the color-adjusted picture signal generated through the color adjustment using the first color adjustment data;
generate a video signal from the received color-adjusted picture signal by performing color conversion based on the color conversion data acquired by the color conversion data acquirer, the color conversion re-adjusting a color tone of the color-adjusted picture signal generated using the first color adjustment data not compatible with the light source, so as to generate the video signal with the re-adjusted color tone; and
transmit the generated video signal to a monitor.

15. The electronic endo scope apparatus according to claim 14,
wherein the processor further comprises a color conversion data storage configured to store at least one kind of color conversion data, and
wherein the color conversion acquirer is configured to select and acquire the color conversion data adapted to the first color adjustment data from the at least one kind of color conversion data stored by the color conversion data storage.

16. The electronic endo scope apparatus according to claim 14,
wherein the processor further comprises:
a color adjustment data storage configured to store second color adjustment data configured such that the video scope generates a picture signal for the observed object with an appropriate color tone through the color adjustment using the second color adjustment data; and
a color adjustment data transmitter configured to transmit, to the video scope, the second color adjustment data stored by the color adjustment data storage.

17. The electronic endo scope apparatus according to claim 14,
wherein the color-adjusted picture signal transmitted by the videoscope has a format in which the picture signal includes a brightness signal and at least two color difference signals, and
wherein the color conversion data is matrix data adapted to convert the picture signal into a picture signal having a format identical to the format of the picture signal.

18. The electronic endo scope apparatus according to claim 14, wherein the color conversion data is matrix data adapted to convert RGB signals into RGB signals.

19. The electronic endo scope apparatus according to claim 14,
wherein the color conversion data is 3×3 matrix data.

20. The electronic endo scope apparatus according to claim 14,
wherein the color conversion data is adapted to convert the color-adjusted picture signal transmitted by the video scope into a picture signal with a color tone such as would be attained when the observed object is observed with naked eyes under illumination with standard light.

21. An electronic endoscope apparatus, comprising a processor and a videoscope connected with the processor,
wherein the videoscope is configured to generate a color-adjusted picture signal from a color image signal for an image of an observed object through color adjustment using color adjustment data and to transmit the generated color-adjusted picture signal to the processor, wherein the processor comprises: a light source configured to emit light for illuminating the observed object;
a determiner configured to determine whether or not the color adjustment data used by the videoscope is adapted to the light source;
a color conversion data acquirer configured to acquire color conversion data adapted compatible with to the color adjustment data when the determiner determines that the color adjustment data is not compatible with the light source; and a color converter configured to:
receive the color-adjusted picture signal generated through the color adjustment using the first color adjustment data;
generate a video signal from the received color-adjusted picture signal by performing color conversion for the picture signal transmitted by the videoscope based on the color conversion data acquired by the color conversion data acquirer, the color conversion re-adjusting a color tone of the color-adjusted picture signal generated using the first color adjustment data not compatible with the light source, so as to generate the video signal with the re-adjusted color tone; and
transmit the generated video signal to a monitor; wherein the videoscope comprises: an image sensor configured to generate a color image signal for the image of the observed object formed under illumination with the light supplied by the light source of the processor;
a color adjustment data acquirer configured to acquire color adjustment data adapted to the light source from the processor;
a color adjustment data storage configured to store the color adjustment data acquired by the color adjustment data acquirer; and
a color adjuster configured to convert the color image signal generated by the image sensor into a color-adjusted picture signal through color adjustment using the color adjustment data stored by the color adjustment data storage.

* * * * *